A. J. GATES.
VALVE FOR CONTROLLING COMPRESSED AIR.
APPLICATION FILED JULY 1, 1911. RENEWED MAY 15, 1913.

1,077,697.

Patented Nov. 4, 1913.
2 SHEETS—SHEET 1.

Witnesses:
Harry S. Gaither
Henry A. Parks

Inventor:
Albert J. Gates
Sheridan Wilkinson Scott Richmond
Attys

A. J. GATES.
VALVE FOR CONTROLLING COMPRESSED AIR.
APPLICATION FILED JULY 1, 1911. RENEWED MAY 15, 1913.
1,077,697.
Patented Nov. 4, 1913.
2 SHEETS—SHEET 2.
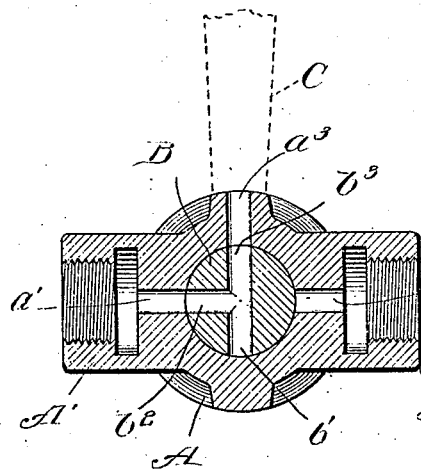
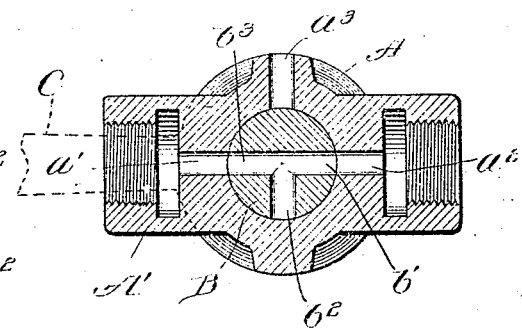
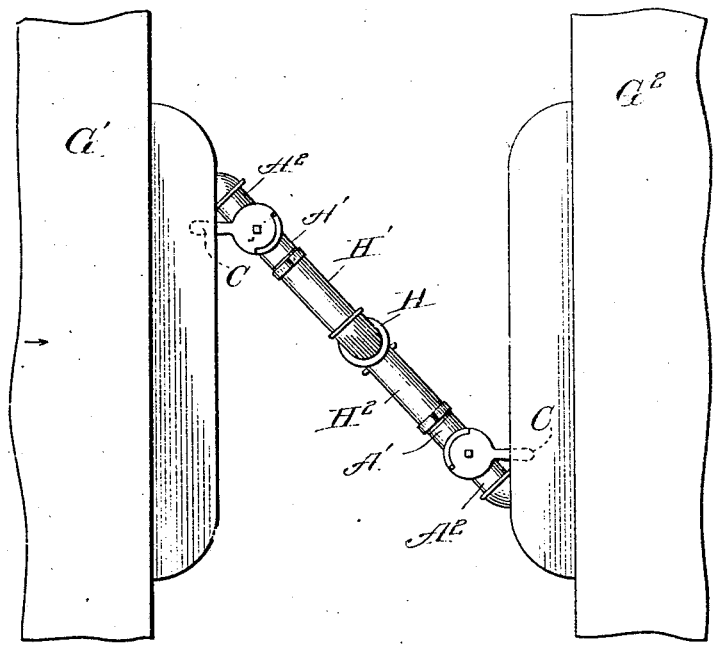
Witnesses:
Harry S. Gaither
Henry A. Parks
Inventor:
Albert J. Gates
By Sheridan Wilkinson Scott & Richmond
Attys

UNITED STATES PATENT OFFICE.

ALBERT J. GATES, OF CHICAGO, ILLINOIS.

VALVE FOR CONTROLLING COMPRESSED AIR.

1,077,697.  Specification of Letters Patent.  Patented Nov. 4, 1913.

Application filed July 1, 1911, Serial No. 636,436. Renewed May 15, 1913. Serial No. 767,903.

*To all whom it may concern:*

Be it known that I, ALBERT J. GATES, a citizen of the United States, residing at Chicago, in the county of Cook and State of Illinois, have invented certain new and useful Improvements in Valves for Controlling Compressed Air, of which the following is a specification.

My invention relates in general to valves for controlling the flow of compressed air, and more particularly to an improved valve for automatically discharging from the compressed air conduit sand or other foreign matter.
In the use of compressed air the sand and dirt which gains ingress to the conduit in various ways is injurious to the apparatus actuated by the compressed air, such, for instance, as a compressed air motor, or the triple valve mechanism in air brakes. Heretofore screens have been employed in compressed air conduits to intercept the sand or other foreign matter before it reaches the air actuated devices. This practice is not wholly satisfactory, as fine particles of the foreign matter pass through the screens, and the intercepted foreign matter remains in and tends to obstruct the conduit.
The primary object of my invention is to provide a valve for controlling the passage of compressed air, or other fluid under pressure, which in turning from closed to open position will momentarily connect the supply passage with an exhaust port, thereby ejecting any accumulated sand or foreign matter before the valve connects the air supply port with the passage leading to the air operated device.
A further object of my invention is to provide a valve controlling the passage of compressed air, or other fluids under pressure, which will protect the air operated mechanism by eliminating accumulated sand, or other foreign matter, and which will be simple in construction, inexpensive in manufacture, and efficient in operation.

My invention will be more fully described hereinafter with reference to the accompanying drawings, in which the same is illustrated as embodied in a convenient and practical form, and in which—

Figure 1:
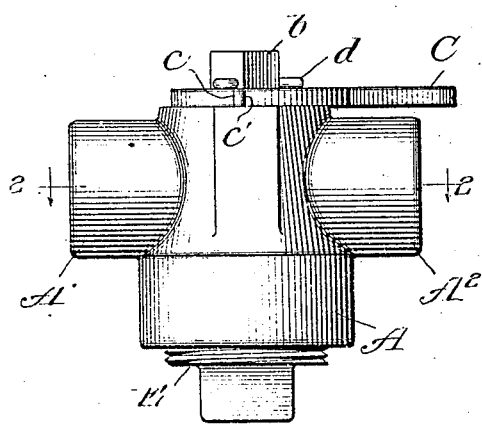
Figure 3:
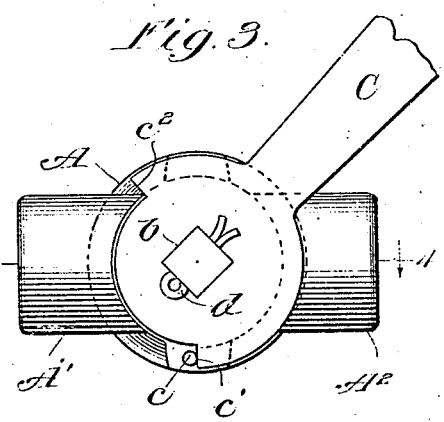
Figure 2:
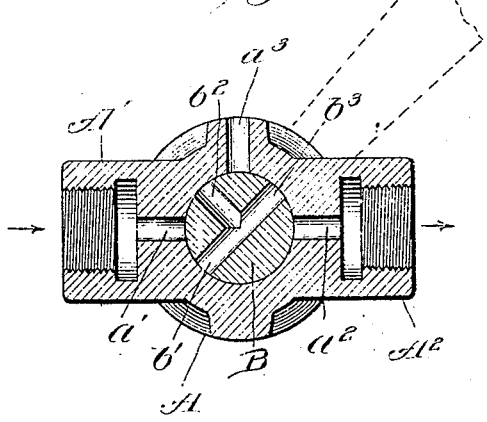
Figure 4:
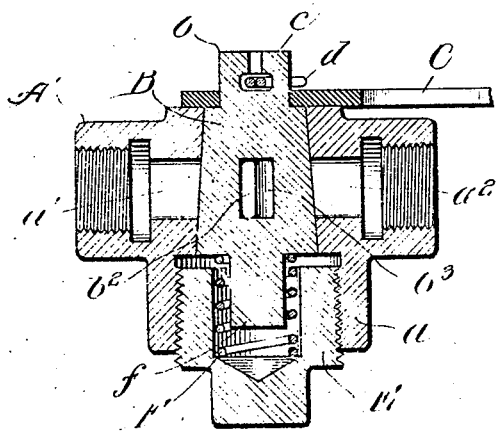

Figure 1 is a side elevation; Fig. 2, a sectional view on line 2 2, Fig. 1, showing the valve in closed position; Fig. 3, a plan view; Fig. 4, a vertical section on line 4 4, Fig. 3; Fig. 5, a sectional view similar to Fig. 2, showing the valve in an intermediate position between closed and open positions; Fig. 6, a view similar to Figs. 2 and 5, showing the valve in open position; and Fig. 7, a view showing the use of my improved valve in lieu of the usual angle cocks of a train-pipe.

Similar reference characters are used to designate similar parts in the several figures of the drawings.

Reference letter A indicates a valve casing having therein a conical valve seat and provided with a coupling A' adapted to be united to a conduit leading from a source of compressed air. The valve casing A is also provided with a coupling A² adapted to communicate with a conduit leading to a compressed air operated device. Ports $a'$ and $a^2$ lead from the couplings A' and A² respectively to the conical valve seat within the valve casing. An exhaust port $a^3$, intermediate of the supply port $a'$ and delivery port $a^2$, extends through the valve casing from the conical valve seat therein.

Located within the valve casing A and engaging the conical valve seat therein is a valve B having therein three radial communicating passages $b'$, $b^2$ and $b^3$ which cooperate with the ports $a'$, $a^2$ and $a^3$, when the valve is moved to different positions. The smaller end of the valve B is provided with a rectangular projection $b$ extending outside of the casing upon which is secured a handle C for turning the valve. A cotter pin $d$ extends through the rectangular reduced portion $b$ of the valve above the surrounding portion of the handle to retain the handle in operative engagement with the valve. The portion of the valve casing adjacent the larger end of the conical valve seat therein is provided with an interiorly screw threaded circular flange $a$ which is engaged by an exteriorly screw threaded plug E between which and the larger end of the valve B is interposed a spring F for retaining the valve in close contact with the surrounding seat.

$f$ indicates a post projecting from the larger end of the valve B within the spring F for retaining the spring in proper operative position.

In order to limit the throw of the valve, the circular portion of the handle which engages the projection $b$ on the valve is cut away to form shoulders $c'$ and $c^2$ which are adapted to engage a stop pin $c$ projecting from the valve casing into the path of movement of the shoulders.

The operation of my improved valve is as follows: When the handle is in the position shown in Figs. 2 and 3 with the shoulder $c'$ in contact with the pin $c$, the three ports in the valve casing, $a'$, $a^2$ and $a^3$, are all closed, so that no pressure is passing from the coupling A' to the delivery coupling $A^2$. In order to connect the supply port with the delivery port and permit compressed air to flow from the source thereof to the air actuated device, the handle C is moved toward the left. When the handle reaches the intermediate position in its movement shown in Fig. 5, the passages $b^2$ and $b^3$ therein connect the supply port $a'$ with the exhaust port $a^3$, thereby permitting compressed air to exhaust to the atmosphere so as to blow out any sand or accumulated foreign matter prior to connecting the compressed air with the air operated device. A further movement of the handle of the valve B toward the left to the position shown in dotted lines in Fig. 6, rotates the valve so as to close the exhaust port $a^3$, and connect the supply port $a'$ with the delivery port $a^2$, by means of the connected passages $b^3$ and $b'$. The valve is located in the open position shown in Fig. 6 through the engagement of the shoulder $c^2$ on the handle with the stop pin $c$.

My improved valve is adapted for use in any connection in which the flow of compressed air is to be controlled, and particularly when a detachable flexible conduit is employed, inasmuch as such flexible conduits when disconnected are often dropped to the ground, thereby receiving sand and dirt, which, if not eliminated from the conduit, will pass to the air operated devices and seriously injure them.

I have shown in Fig. 7 the application of my improved valve to air brakes, the pipes of which are ordinarily provided with screens to intercept the sand and other foreign matter and prevent it passing through the triple valve mechanism. In Fig. 7 reference characters G' and $G^2$ indicate diagrammatically the adjacent ends of two coupled cars. H' and $H^2$ indicate the usual flexible pipe sections provided with detachable couplings H to permit them to be united or disconnected when the cars are coupled or uncoupled. It is usual to provide an angle cock in the train-pipe at each end of each car adjacent the flexible hose thereon, such angle cock to be closed when the adjacent end of the car is not coupled to another car, and to be opened when the adjacent end of the car has been coupled to another car and the flexible hose sections of the train-pipe coupled together. I have shown my improved valve as employed in lieu of the usual angle cocks, in Fig. 7, in which the valves are shown in closed position. Assuming that the car diagrammatically indicated at G' is nearer the engine than the car $G^2$, when the valves are opened, the valve on the car $G^2$ will when it reaches the intermediate position shown in Fig. 5 permit a preliminary exhaust of the compressed air to the atmosphere, thereby eliminating the sand or other foreign matter which may have accumulated in the train-pipe. The further movement of the valve to the position shown in Fig. 6 discontinues the momentary exhaust to the atmosphere and permits the direct passage of the compressed air through the valve. When the car $G^2$ is nearer the engine and the compressed air consequently passes toward the left in Fig. 7, the valve on the car G' serves to effect a momentary exhaust to the atmosphere in its movement from closed to open position, thereby eliminating sand and other foreign matter. It will be observed that in using my improved valve in lieu of the ordinary angle cocks on the train-pipe a momentary exhaust of compressed air will be effected from the valve on the car farthest away from the locomotive.

From the foregoing description it will be observed that I have invented an improved valve for controlling the flow of compressed air from a source thereof to an air actuated device, which will eject from the air conduit sand or other foreign matter prior to connecting the compressed air with the actuated device, thereby avoiding the necessity of the use of intercepting screens, and at the same time effectively protecting the air operated device from the injury necessarily resulting from sand or other foreign matter being carried thereto by the compressed air.

While I have described more or less in detail the specific form in which I have illustrated my invention as embodied, yet I do not wish to be understood as limiting myself thereto, as I contemplate changes in form, proportion of parts, and substitution of equivalents, as circumstances may require, or as may be deemed expedient.

I claim:

1. In a device for controlling the flow of compressed air, the combination with a casing having supply, delivery and exhaust ports, of a valve in said casing adapted to close all of said ports when in one position and having passages for connecting said supply and exhaust ports prior to connecting said supply and delivery ports, thereby preliminarily ejecting foreign matter, and means for restricting the movement of said valve relatively to said casing to said described operation.

2. In a device of the character described, the combination with a conduit leading from a source of fluid under pressure, of a valve casing with which said conduit communicates, a conduit leading from said casing to a fluid operated device, said casing having an exhaust port intermediate of its connections with said conduits, a valve in said casing having a passage adapted to connect or disconnect said conduits, said valve also having a passage for connecting said first conduit with said exhaust port momentarily during the movement of the valve from closed to open positions, and means for restricting the movement of said valve relatively to said casing to said described operation.

3. In a device of the character described, the combination with a valve casing having two ports and an intermediate exhaust port, of supply and delivery conduits communicating respectively with said two ports, a valve in said casing adapted to close said two ports when in one position and having a passage adapted to connect said two ports and also having a passage adapted to connect the supply port with the exhaust port during the preliminary movement of the valve from its closed to its open position, and means for restricting the movement of said valve relatively to said casing to said described operation.

4. A valve mechanism for controlling the flow of fluid under pressure comprising a valve and seat having coöperating ports and passages for preliminarily discharging fluid under pressure during the movement of the valve from closed to open positions and for permitting a free flow of fluid through said valve when in open position, and means for restricting the movement of said valve relatively to said seat to said described operation.

5. A valve mechanism for controlling the flow of fluid under pressure comprising a valve seat having supply and delivery ports and an intermediate exhaust port, a valve coöperating with said seat for closing said supply and delivery ports when in one position and having passages for momentarily connecting said supply and exhaust ports and subsequently connecting said supply and delivery ports, and means for restricting the movement of said valve relatively to said seat to said described operation.

In testimony whereof, I have subscribed my name.

ALBERT J. GATES.

Witnesses:
HENRY A. PARKS,
EDYTHE M. ANDERSON.